Figure 10:
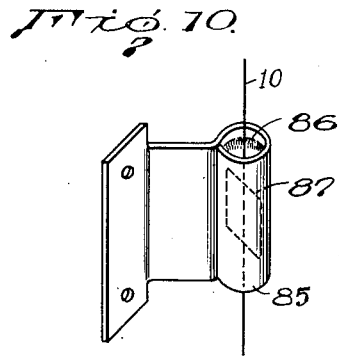

Aug. 25, 1942.  O. F. RITZMANN  2,294,320
OSCILLOGRAPH
Filed June 6, 1940  3 Sheets-Sheet 1
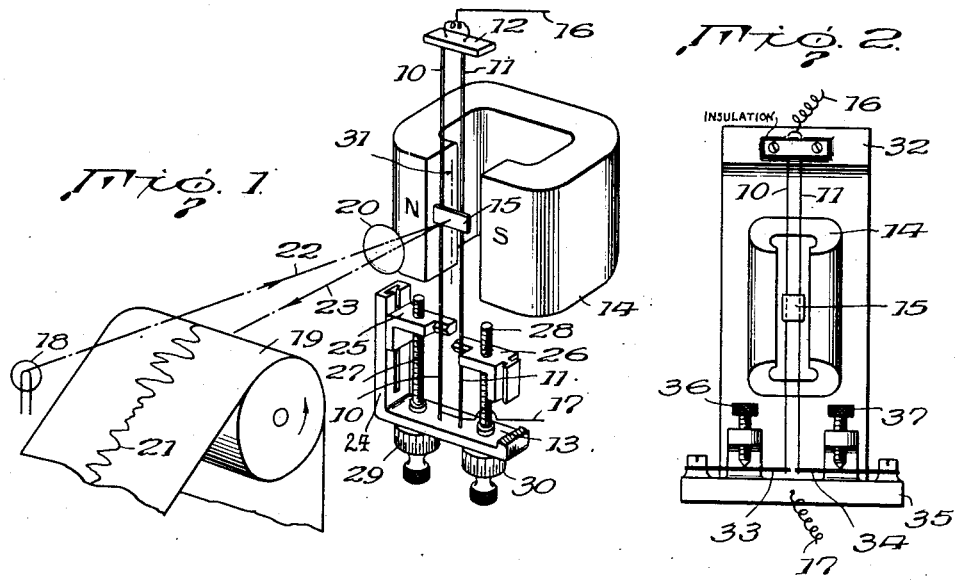
Inventor
O. F. Ritzmann,
By A. M. Houghton
his Attorney

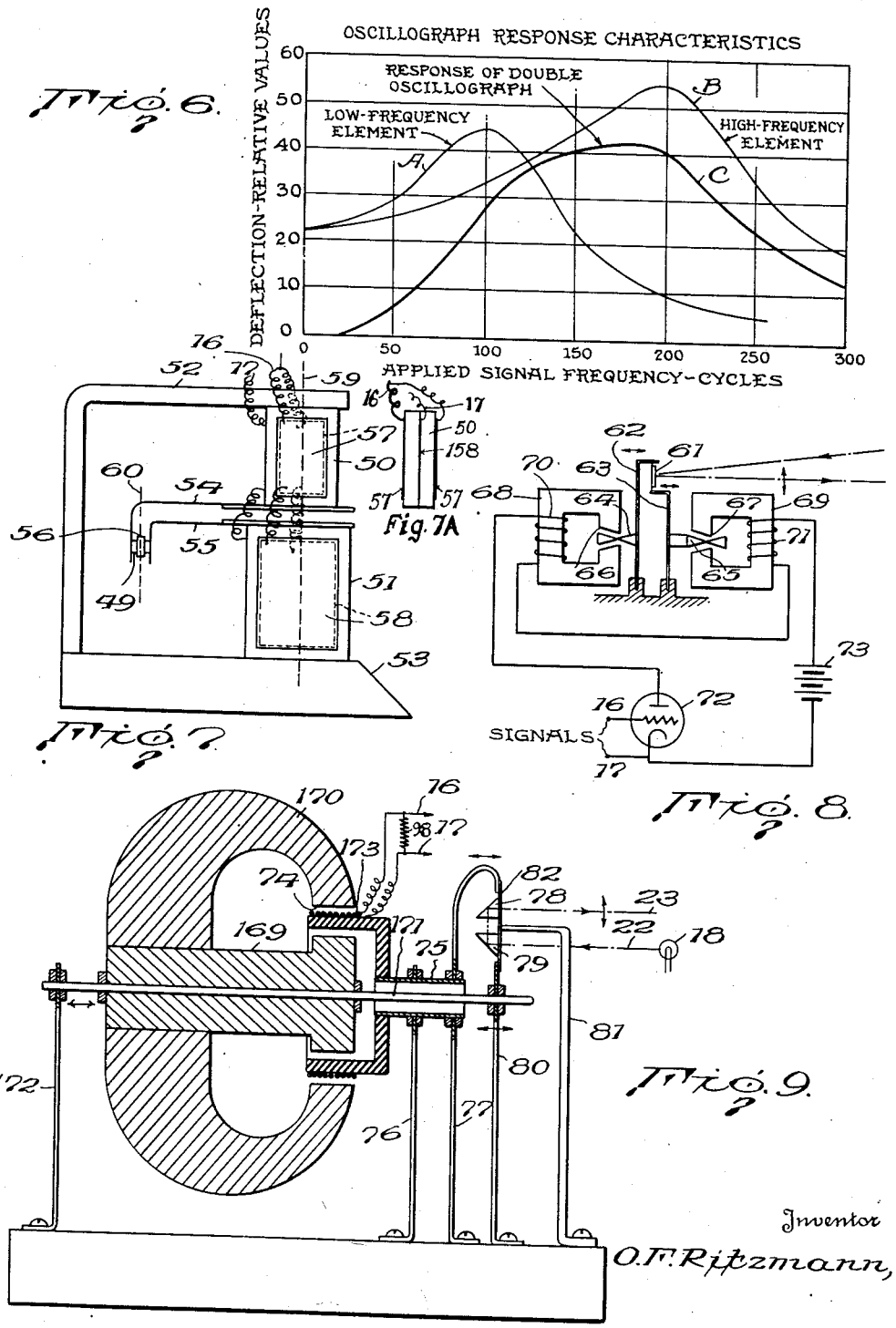

Aug. 25, 1942.                O. F. RITZMANN                2,294,320
                                OSCILLOGRAPH
                             Filed June 6, 1940            3 Sheets-Sheet 3

Inventor
O. F. Ritzmann,
By A. M. Houghton
   his Attorney

Patented Aug. 25, 1942

2,294,320

UNITED STATES PATENT OFFICE 2,294,320

OSCILLOGRAPH

Otto F. Ritzmann, Aspinwall, Pa., assignor to Gulf Research & Development Company, Pittsburgh, Pa., a corporation of Delaware Application June 6, 1940, Serial No. 339,205

9 Claims. (Cl. 171—95)

This invention relates to oscillographs; and it comprises an improved oscillograph of particular utility in seismograph recording, comprising a pair of electrically actuated vibratory oscillograph elements of different natural vibration frequencies adapted to vibrate upon application of an oscillating electrical signal thereto, circuit means for applying such a signal simultaneously to the pair of elements, and means for combining the instantaneous deflections of the two elements in opposite senses, so that the net response to signals of relatively high and relatively low frequencies is small; all as more fully hereinafter set forth and as claimed.

In seismograph prospecting, a charge of explosive is set off in the earth, thereby causing propagation of seismic waves in the earth, and the waves are detected at a plurality of electromechanical detectors or detector groups spaced from the source of waves. The electrical signals from the detectors are amplified and are recorded by means of an oscillograph. The usual form of oscillograph includes a small coil for each detector or group of detectors, resiliently mounted between the poles of a magnet and supplied with the detector signals. The oscillating detector signal causes the coil to vibrate correspondingly and the vibrations are recorded with the aid of a small mirror attached to the coil, which directs light from a lamp upon a moving sheet of photographic paper.

The seismic waves as received include a wide range of frequencies. It is desired to record for study waves of only a limited range of frequencies, and eliminate from the record waves of higher and lower frequencies. In practice this is usually achieved by providing electrical filters in the signal amplifiers. Such filters properly constructed and operated give good results, but they are relatively cumbersome, and in general the more effective they are, the more complication and bulk they introduce. It has been proposed in certain special types of heterodyne amplifiers to employ a single tuned string oscillograph galvanometer, to respond only to a very narrow band of frequencies, but such a galvanometer does not respond to any wide range of frequencies. The response function is sharply peaked at the tuned frequency.

According to the present invention the desired result of recording only a selected band of frequencies is achieved by the provision of a double oscillograph of such construction as to be sensitive only to signal frequencies within a predetermined limited range. The electromechanical oscillograph elements themselves are constructed to act as filters. As these elements are small and compact, the amplifier and oscillograph assemblage, utilizing the oscillograph construction of the present invention, is much more compact than the ordinary electrically filtered amplifier and oscillograph assemblages. In the present invention the amplifier can be an ordinary "linear" type, without filters. The oscillograph of the present invention is not appreciably larger than ordinary oscillographs. Other advantages are realized in the invention, in addition to a saving in bulk and weight. The apparatus of the present invention is simpler to adjust, and to keep in adjustment, than some of the complex filter circuits employed to achieve the desired filtering action.

According to the invention in lieu of the usual single vibratory oscillograph element, a pair of vibrating elements is provided having different resonant frequencies, that is, different natural periods of vibration. The resonant frequencies are selected within the desired frequency range. Sufficient damping is usually provided so that the elements respond to all frequencies between the tuning frequencies and to frequencies somewhat above and below them. A light source and traveling photographic sensitized paper are provided in a customary arrangement, and reflecting means are provided for the vibratory elements in such manner that the light beam from the source to the paper is vibrated to a degree corresponding to the relative movement between the two vibratory elements. The result is that electrical signals within the desired range are recorded, while signals of higher and lower frequencies are not recorded, or are recorded at reduced amplitude. The resonant frequencies are readily adjusted, as by varying the length of the resilient coil suspensions if coil type oscillograph elements are used. The general character of the function of galvanometer sensitivity versus applied signal frequency is determined by this adjustment, by the relative sensitivity of the two vibratory-elements and by the amount of damping provided.

In the accompanying drawings there are shown diagrammatically several examples of specific embodiments of apparatus within the purview of the invention, and charts illustrative of the principles of operation. In the drawings:

Fig. 1 is a perspective view of one form of double oscillograph of the string type, with associated recording means, Fig. 2 is a view in elevation of a modified form of double string oscillograph, Fig. 3 is a perspective view of a double coil oscillograph with independent reflecting elements, Figs. 4 and 5 are circuit diagrams showing optional ways of interconnecting the two coils of the apparatus of Fig. 3, Fig. 6 is a chart showing the response characteristics of a typical embodiment of the apparatus of Fig. 3, Fig. 7 is a view in elevation of a double piezoelectric type oscillograph, Fig. 7A is a detail view in side elevation of one of the crystals of Fig. 7, Fig. 8 is a diagrammatic view of a double magnetic vane or reed oscillograph, Fig. 9 is a view partly in elevation and partly in central vertical section of an electromagnetic oscillograph constructed according to the principles of the invention, Fig. 10 is a detail view of damping means useful with the apparatus of Figs. 1 to 5, Fig. 11 is a view illustrative of a modification of Fig. 1 arranged for automatic frequency control, and Figs. 12, 13, 14 and 15 are charts and diagrams illustrative of certain principles on which the invention is based.

Referring to the drawings:

Fig. 1 shows the invention embodied in an oscillograph of the string type. Two parallel metal "strings" shown as ribbons 10 and 11 are mounted under equal or unequal tension between an upper support 12 and a base 13. Round wires can be used instead of ribbons if desired. The strings extend through the gap of a permanent magnet 14 as shown, and are affixed to a small lightweight mirror 15, at about the middle of the wires. Signal current is applied to the wires in parallel through leads 16 and 17. A light source 18, a traveling sheet 19 of sensitized paper or film and a fixed lens 20 are provided in a known arrangement. A light beam from the lamp is reflected from mirror 15 to the paper and is imaged thereon by the lens to form a trace 21. The axis of the beam from the lamp is shown at 22 and of the reflected beam at 23. The strings are tuned to different vibratory frequencies with the aid of two bridges, 25 and 26, engaging the strings and adjustable by screws 27 and 28 with calibrated heads 29 and 30, to expose different active lengths for the two strings and thus to tune the oscillograph. The bridges slide in guides, only one of which is shown (at 24) for the sake of clarity. In typical cases string 10 may be tuned to a frequency of say 70 cycles and string 11 to 15 cycles. The particular tuning frequencies selected depend on particular circumstances.

In operation, on application of an oscillating signal at leads 16 and 17, strings 10 and 11 vibrate (at a relatively low amplitude) in the same direction. For very low applied frequencies the strings move in unison at equal amplitude and the mirror is not rotated; the effective sensitivity of the galvanometer is zero. For very high frequencies neither string moves and the effective sensitivity again is zero. For frequencies intermediate the tuning frequencies (e. g. 15 and 70 cycles in the example) the angular displacement of the mirror about the axis of symmetry 31 is proportional to the difference in the instantaneous deflections of the two strings.

Fig. 2 shows a similar construction except that tuning of the strings is accomplished by varying the tension thereon rather than the effective length. A pair of strings 10 and 11 is supported at the top from a standard 32 and at the bottom from two flexible members 33 and 34, affixed to the base 35 of the standard as shown and adjusted by screws 36 and 37 to put the two strings under predetermined different tensions. The galvanometer in practice is set up with a lamp, lens and recording sheet as in Fig. 1. The operation of the apparatus of Fig. 2 is similar to that of Fig. 1.

Fig. 3 shows the invention embodied in a moving coil type of oscillogragh. Two coils 40 and 41 are mounted by elastic filaments 42, 43, 44 and 45 from supports 12 and 13 between the poles of a magnet 14. Each coil carries a delicate mirror 46 and 47 arranged at approximately a right angle to each other in the normal or zero position of the galvanometer. Light is reflected from lamp 18, across the two mirrors and thence to a recording surface. The coils can be connected in series (Fig. 4) or in parallel (Fig. 5) with a resistor 48 arranged as shown to make the deflection of each coil, for direct or very low frequency alternating current, the same.

Damping means of any suitable sort are provided for the strings in the several embodiments, these being omitted from Figs. 1 to 5 for the sake of clarity of presentation. One suitable damping means is shown to an enlarged scale in Fig. 10. It includes a small sleeve 85, a few millimeters in diameter, adapted for attachment to some fixed part of the apparatus (not shown) and encircling the oscillograph string or the suspension as shown. A drop of oil 86, retained by surface tension in the sleeve, damps the movement of the string. A small vane 87 is conveniently attached to the string or suspension as shown to increase the damping effect. For maximum effect the damping means is best placed close to the mirror where the vibration amplitude is large.

Fig. 6 shows the response characteristics for one particular embodiment of the apparatus of Fig. 3, wherein one coil suspension was tuned to 102 cycles and the other to 193 cycles. The deflection of the low frequency coil at various applied frequencies is shown by curve A, that of the high frequency coil by curve B, and that of the combination by curve C. Curve C shows a high and fairly uniform response in about the range 120 to 200 cycles, diminishing to zero at about 20 cycles.

Figure 12:
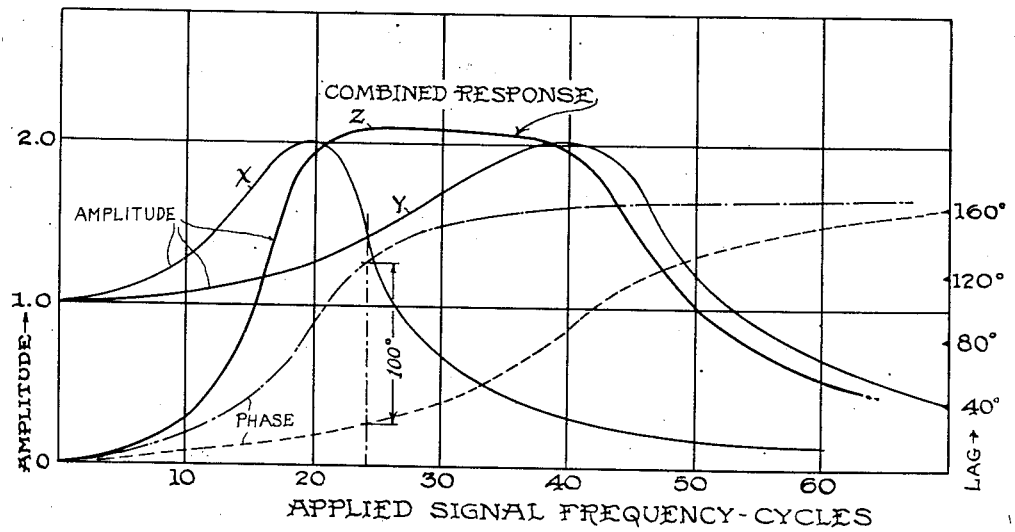
Figures 13, 14, 15:
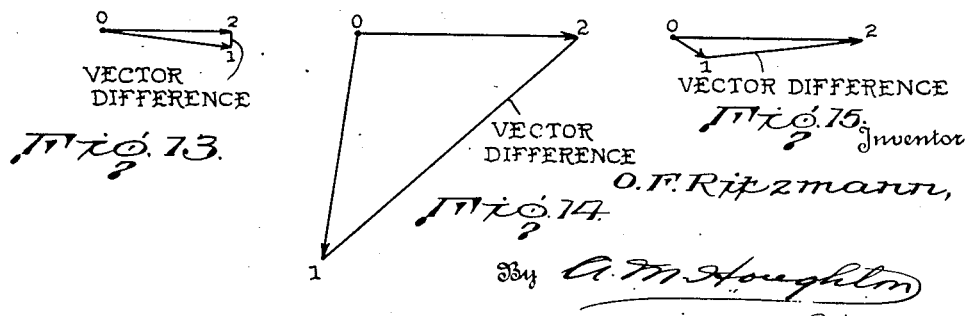

Figs. 12, 13, 14 and 15 illustrate in somewhat more detail the principles upon which the invention, in a typical embodiment (Fig. 3) is based. In Fig. 12, it is assumed that the oscillograph constants are selected to give equal peak responses of twice the direct current responses at 20 and 40 cycles. The solid curves X and Y show amplitude of response of the low frequency element and the high frequency element. The heavy curve Z gives the combined response. The phase-shift curves (dash lines) corresponding to the two elements show that at very low frequencies the displacement (deflection) is in phase with the applied force. As the frequency is increased, the coil with its mirror begins to lag behind the applied force. The lag increases gradually at first, but increases quite rapidly near the resonant frequency and thereafter gradually approaches 180 degrees, so that at the highest frequencies the mirror of each coil is being forced clockwise most vigorously when it is in the extreme anticlockwise part of its oscillation, and vice versa. The phase curves of the two elements separate quite widely near resonance and this is accounted for by combining the responses of the elements vectorially, as shown in Figs. 13, 14 and 15. Fig. 13 represents conditions occurring at a very low frequency, such as five cycles. The two arrows, 0—1 and 0—2, are vectors representing the individual responses of the two elements. The angle between the arrows is the difference in their phases, which may be taken directly from the curves of Fig. 12. Since the outputs are combined in opposition, the difference of these two vectors must be taken. This difference is 1–2, the third side of the triangle formed by the two vectors. At some higher frequency near 24 cycles, where the amplitudes are equal, there is a phase difference of about 100 degrees. Fig. 14 shows the diagram for this condition. The vector difference is greater than either of the original vectors. Fig. 15 is a vector diagram for about 50 cycles. The heavy curve Z in Fig. 12, showing the net response of the double oscillograph as a unit, may be constructed graphically from the other curves by means of a number of these vector diagrams. The resultant curve is much more desirable than would be expected from an inspection of the two original curves.

Fig. 7 shows the invention embodied in a piezoelectric type oscillograph element, comprising two crystals 50 and 51 of Rochelle salt or other piezoelectric material cemented respectively to a standard 52 and a base 53. The crystals are of the bimorph twister type; see below. The crystals are of different size or are loaded differently so that their resonance frequencies are different. To the free ends of the crystals are cemented two light-weight vanes 54 and 55, carrying a delicate mirror 56 mounted at their extremities by thin elastic filaments 49. Metal foil plates 57 and 58 are attached to opposite faces of the crystals as shown, and a third plate 158 is cemented between the component slabs of each crystal, as is apparent in Fig. 7A. Electrical connection 16 is made to the four exterior metal foil plates of the two double crystals, and connection 17 is made to the two interior plates 158 of the two double crystals. The orientation of the crystal axes is such that a voltage applied across leads 16 and 17 causes the crystals to twist about central axis 59, so as to rotate arms 54 and 55, in the same direction. The mirror does not move when steady current or very low frequency oscillating current is applied across the leads, but when the applied frequencies are in the neighborhood of the resonance frequency of either crystal the vanes vibrate and there is a difference in phase between their vibrations. The mirror vibrates about axis 60 with magnified amplitude (due to the length of the vanes), and its vibrations are recorded with the aid of an optical system like that of Fig. 1. The apparatus can conveniently be damped by putting a drop of oil (not shown) between arms 54 and 55.

As stated, each crystal is of a type known in the art as a twister bimorph, made of two crystal slabs cemented together flatwise. The slabs are both cut from the same (flattish) Rochelle salt crystal with edges parallel to the sides and ends of the crystal. Slabs of this type tend to shift from rectangular to rhomboidal or diamond shape when sandwiched between electrified metal plates. When the two slabs are cemented face to face they are placed so that the expanding diagonal of one slab lies along the contracting diagonal of the other and vice versa. Thus the crystal tends to operate like a bimetallic element along both diagonals, but with opposite curvatures so that the net effect is a twisting of the composite crystal.

In Fig. 8 the invention is shown embodied in a magnetic vane type galvanometer, including two resilient reeds or vanes 62 and 63 of different length carrying tapered iron pole pieces 64 and 65 extending into tapered air gaps 66 and 67 of a pair of iron cores 68 and 69 wound with coils 70 and 71 which are magnetized by the output of a vacuum tube 72, arranged in circuit with the coils and a battery 73 as shown. A mirror 61 is flexibly mounted between the ends of the vanes as shown. Signal energy is applied to the tube at 16 and 17. The direct current component of the plate current causes each vane to move equally (to the right) so that little or no displacement of the mirror occurs. Differences in motion of the two vanes occur when signals applied are in the neighborhood of the natural frequency of the vanes, and the movement is amplified by the mirror.

In Fig. 9 the invention is shown applied to an electromagnetic oscillograph including a permanent magnet 170 with pole piece 169, supported on a rod 171 and leaf springs 172 and 80 for movement parallel to the rod. A coil 173 to which the signal is applied at 16, 17 is mounted concentrically in the air gap 74 of the magnet, for free movement with respect to the magnet, by means of a sleeve 75 and a pair of leaf springs 76 and 77 as shown. A pair of prisms 78 and 79 are resiliently mounted by ligaments 82 between springs 77 and 80 and fixed support 81 in such manner that relative movement of the coil and the magnet causes the prism assemblage to rock as is apparent from the drawings. The incoming beam 22 is reflected twice by the prism assemblage before issuing at 23, so that deflection of the beam occurs only when the coil and magnet are deflected in the same direction. This condition occurs only in the neighborhood of the resonance frequency of the two moving systems; at other frequencies their displacements are opposite in direction. A resistor 98 across leads 16 and 17 affords damping.

Figure 11:
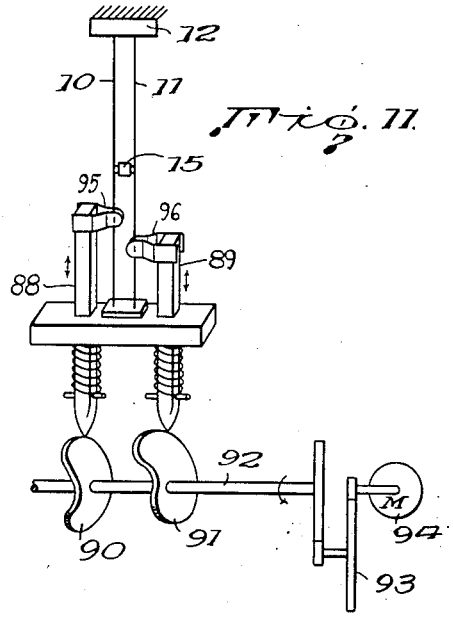

The apparatus of the invention lends itself well to automatic tuning of the oscillograph during actual receipt of signals. Fig. 11 shows one convenient way of adapting the apparatus of Fig. 1 for automatically controlled frequency response. In lieu of the micrometer bridges of Fig. 1 there is substituted a pair of spring-urged plungers 88 and 89, each having a grip or damper 95 and 96 engaging strings 10 and 11, and moved by a pair of cams 90 and 91 mounted on a shaft 92 rotated through speed reduction gearing 93 by a motor 94. In operation, the motor is caused to rotate at a predetermined rate during receipt of signals, thereby changing the tuning of the strings according to any desired function of time determined by the speed of rotation of shaft 92 and the shape of the cams. In seismograph prospecting it is often desired to change the tuning of a receiving system during the course of receipt of a train of waves, and this is readily accomplished by the system shown. One shaft and motor can be arranged to control any desired number of oscillographs.

The invention is not limited to embodiment in any particular form of oscillograph but contemplates any suitable pair of electrically responsive vibrating elements, of different resonant frequencies, combined with means for combining in opposite senses and exhibiting instantaneous deflections of the two elements.

The oscillograph of the present invention has been described primarily with reference to seismography, but it is useful wherever its special characteristics may be needed. For example, in electroacoustical measurement of the depths of wells, a cap is fired at the top of the well and reflections are received by a microphone and recorded by an oscillograph. It is advantageous in such systems to record only the higher frequencies. My oscillograph gives good results in such systems. The oscillograph can of course be connected directly to a wave detector, if signal amplification is not considered necessary. It can be used with any type of amplifier, including heterodyne amplifiers, automatic volume controlled amplifiers, etc. If desired the amplifier can be of the tunable type.

What I claim is:

1. A frequency-selective oscillograph comprising in combination an electrically actuable pair of vibratory bodies having different resonant vibratory frequencies and arranged to vibrate upon application of an oscillating electrical signal, circuit means for applying an oscillating electrical signal thereto, whereby one body is caused to vibrate with amplitude having a maximum at some one frequency and the other body is caused to vibrate with amplitude having a maximum at a different frequency, deflectable light reflecting means attached to the two bodies in such manner that the reflecting means is subject to deflection by both bodies, a source of light directing light toward the reflecting means and a surface receiving a beam of light reflected from the reflecting means; whereby the deflection of said beam of light at any instant is combined of the deflections of said two bodies at that instant.

2. A frequency selective oscillograph comprising in combination an electrically actuable pair of tuned vibratory bodies having different resonant vibratory frequencies and arranged to vibrate upon application of an oscillating electrical signal, circuit means for applying an oscillating signal thereto, and deflectable exhibiting means affixed to said pair of bodies so as to be subject to deflection by each, for combining and exhibiting the instantaneous deflections of the bodies in opposition, whereby the response of the oscillograph to extreme frequencies is small.

3. A frequency selective oscillograph comprising in combination a pair of tuned, electrically actuated oscillograph elements adapted to vibrate under applied electrical signal energy and having different resonant frequencies, circuit means for applying an electrical signal to both elements, and deflectable means secured to and operated upon by both said elements, for exhibiting relative movement of the two elements with respect to each other.

4. A frequency selective oscillograph comprising in combination a pair of electrically actuated oscillograph elements adapted to vibrate under applied signal energy and having different resonant frequencies, circuit means for applying an electrical signal to both elements, and a recording optical system including reflecting means connected to the elements and adapted to move through an angle proportionate to the instantaneous difference between the deflections of the elements from the normal position assumed by them in the absence of an applied electrical signal.

5. A frequency selective oscillograph comprising in combination a pair of electrically actuable vibratory bodies of adjustable vibratory frequency, electrical circuit means for applying an oscillatory electrical signal of sensible duration thereto, deflectable means subject to simultaneous deflection by both said bodies, for combining and exhibiting the instantaneous deflections of the bodies in opposition, and means for adjusting the vibratory frequencies of the two bodies during the time of receipt of said signal.

6. A frequency selective oscillograph comprising in combination a pair of tuned mechanical vibratory elements having different resonant frequencies, means for electrically applying force to both elements from a single source, and deflectable exhibiting means subject to deflection by both said elements, for combining the instantaneous deflections of the two elements in opposite senses so that response to extreme frequencies is small.

7. A frequency selective oscillograph comprising a pair of electrically-driven tuned mechanical vibratory elements tuned to different resonant frequencies and similar sensitivities at frequencies well beyond the resonant frequencies and means subject to deflection by both said elements, for combining the instantaneous deflections of the elements in opposition, whereby extreme frequencies are cancelled.

8. A frequency selective oscillograph comprising a permanent magnet providing a gap between poles thereof, a pair of coils and resilient suspension means for the coils between the poles in said gap, adjusted so that each coil is free to vibrate at a different resonant frequency, circuit means for applying a single signal to both coils, a mirror means associated with each of the suspended coils, a light source directing light to the mirror means in such manner that light from the source is reflected from the one mirror means to the other and thence away from the second mirror means, and a receiving surface for the doubly reflected light, whereby to exhibit on said surface the combined instantaneous deflections of the coils.

9. A frequency selective oscillograph for recording vibrating electrical signals, comprising two resilient vibratory bodies having different resonant vibratory frequencies and mounted for vibration, electrical circuit signal-applying means associated with said bodies for causing both vibratory bodies to vibrate under the influence of a vibrating electrical signal, and deflectable exhibiting means attached to both vibratory bodies and operated on by them both such that the deflection of the exhibiting means at any instant of time is combined of the instantaneous deflections of the two vibratory bodies.

OTTO F. RITZMANN.